May 5, 1925.
E. A. BRYANT
1,536,072
AUTO LOCK
Filed April 10, 1922
2 Sheets-Sheet 1
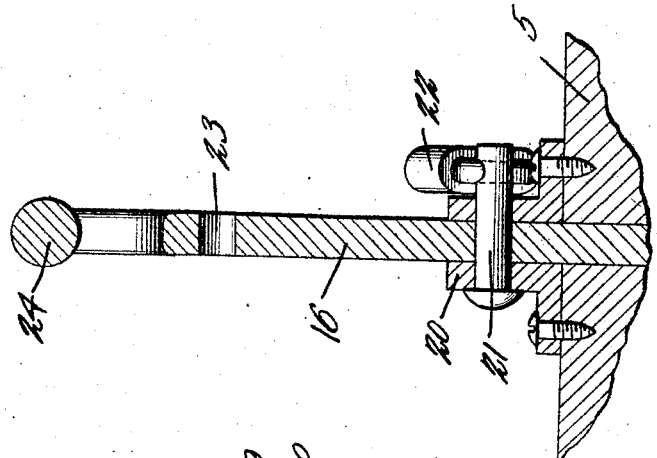
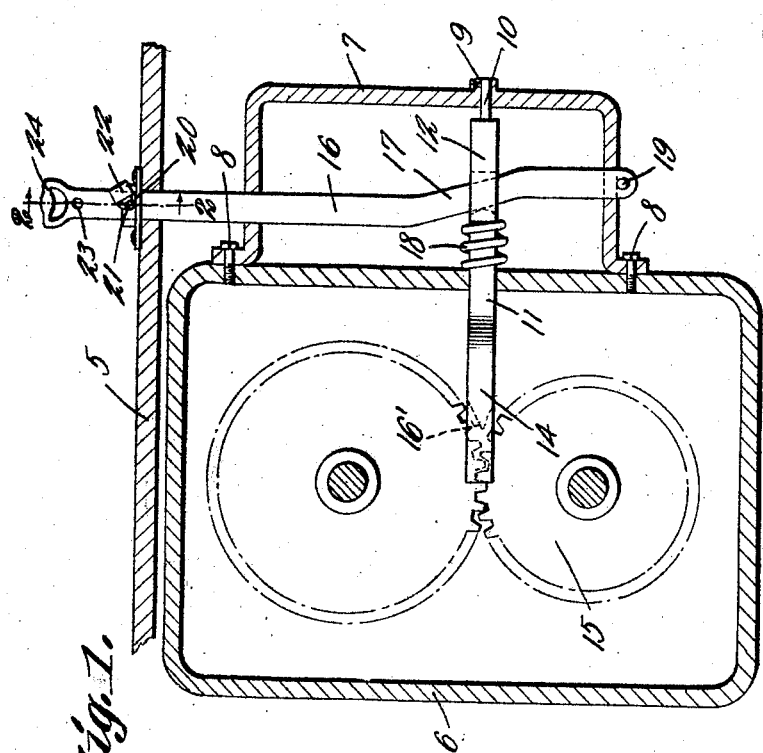
Inventor,
E. A. Bryant.
By C. A. Snow & Co.
Attorney May 5, 1925.

E. A. BRYANT

AUTO LOCK

Filed April 10, 1922

Inventor,
E. A. Bryant,
By C. A. Snow & Co.
Attorney

Patented May 5, 1925.

1,536,072

UNITED STATES PATENT OFFICE.

EUGENE A. BRYANT, OF MINNEAPOLIS, MINNESOTA.

AUTO LOCK.

Application filed April 10, 1922. Serial No. 551,203.

*To all whom it may concern:*

Be it known that I, EUGENE A. BRYANT, a citizen of the United States, residing at Minneapolis, in the county of Hennepin and State of Minnesota, have invented a new and useful Auto Lock, of which the following is a specification.

This invention relates to motor vehicle locks, and more particularly to a lock designed to operate in conjunction with the gearing of the transmission thereof.

An object of the invention is to provide a lock of this character which may be readily and easily operated from a point adjacent to the operator's seat, thereby eliminating the necessity of the operator alighting to accomplish the locking or unlocking of the device.

With the foregoing and other objects in view which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

Referring to the drawings:—

Figure 1 is a vertical sectional view through a transmission casing disclosing the lock as applied thereto.

Figure 2 is a sectional view taken on line 2—2 of Figure 1.

Figure 4:
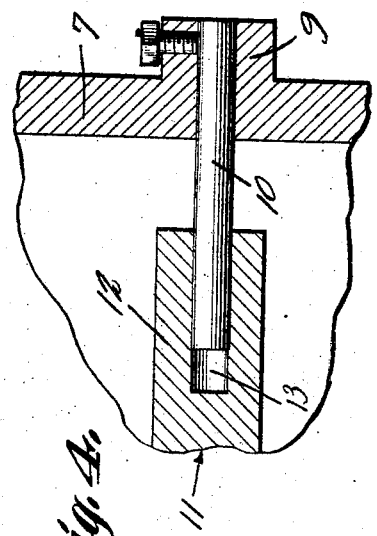
Figure 4 is a sectional view taken on line 4—4 of Figure 3.
Figure 5:
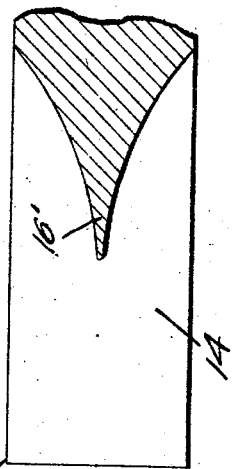
Figure 5 is an enlarged detail view of the gear engaging locking arm.
Figure 3:
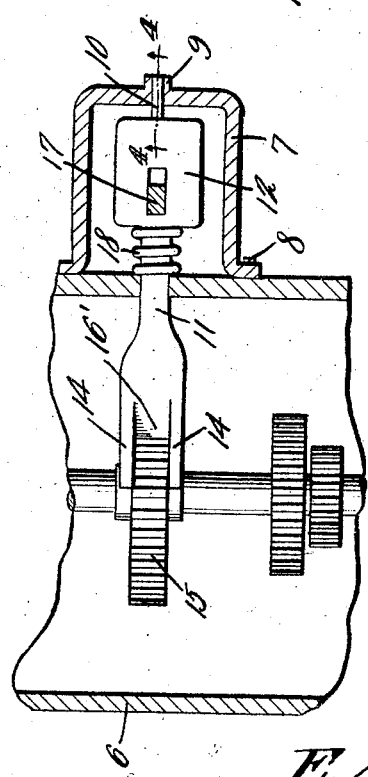
Figure 3 is a transverse sectional view taken at a point above the gears of the transmission.

Referring to the drawings in detail, the reference character 5 designates the floor board of a motor vehicle, the transmission housing indicated at 6 being supported thereunder in the usual manner.

The invention includes an auxiliary housing 7 which is secured to the transmission housing 6 as by means of the securing bolts 8, there being provided a boss 9 formed on one wall of the housing 7 which boss is provided with an opening to accommodate the guide rod 10 which extends inwardly from the housing 7.

The locking arm indicated at 11 has an enlarged portion 12 disposed within the housing 7 and as clearly shown by Figure 4 of the drawings, is provided with an opening 13 to accommodate the rod 10, so that the arm 11 is held in perfect alignment with the gears of the transmission at all times.

This arm 11 is provided with spaced arms 14 adapted to embrace portions of the sides of the main gear 15 of the transmission, there being provided a tapered portion 16' forming a part of the arm 11, which tapered portion is adapted to be forced between the teeth of the gears to prevent movement thereof. Associated with the arm 11 is an operating arm 16 which is disposed vertically, and has a portion thereof passing through an opening in the floor board 5, the lower portion of the arm 16 being offset as indicated at 17, the offset portion passing through a suitable opening in the arm 11 whereby the inclined walls formed by the offset portion 17 will cause the arm 11 to be moved laterally when the arm 16 is moved vertically.

Supported on the arm 11 at a point between the enlargement 12 and outer wall of the housing 6 is a coiled spring 18 that normally exerts a pressure on the arm 11 to hold the tapered portion 16' out of contact with the gears associated therewith.

As shown, the lower extremity of the operating arm 16 extends through an opening formed in the lower wall of the housing 7, where the same is provided with a transversely extending pin 19 adapted to engage the lower wall of the housing 7 to prevent the operating arm 16 from being withdrawn from the housing 7, when the arm 16 is pulled upwardly moving the arm 11 out of operation.

The upper portion of the arm 16 operates through a retainer 20 which is provided with openings to accommodate the locking pin 21, which pin has an opening to receive the shackle of the lock 22. Formed in the bar 16 are suitable spaced openings, the opening 23 adjacent to the handle portion 24 of the arm 16 being for the purpose of locking the arm 16 in its lowermost position, while the opening which accommodates the pin 21, as shown by Figure 2 of the drawings, is used for locking the arm 16 out of operation.

In the use of the device, assuming that the elements are in positions as indicated by Figure 1 of the drawings, and it is desired to lock the same to prevent unauthorized persons from moving the vehicle, it is only necessary to remove the pin 21 from the opening, whereupon the arm 16 may be forced downwardly. It follows that as the arm 16 moves downwardly, the walls of the offset portion 17 cam the arm 11 inwardly to bring the tapered portion 16' thereof into close engagement with the teeth of the gears of the transmission.

The arm 16 is now locked in this position by passing the pin 21 through the opening 23 which registers with the openings in the retainer 20. A padlock may now be positioned in the opening of the pin 21 to prevent removal of the pin, with the result that the arm 16 is locked against movement.

When it is desired to unlock the transmission, the pin 21 is removed by removing the padlock and the arm 16 pulled upwardly. It follows that the spring 18 forces the arm 11 laterally to disengage the gears of the transmission.

Having thus described the invention, what is claimed as new is:—

A locking device for transmission gears including a housing, an auxiliary housing secured to the gear housing, a guide rod extending inwardly from the auxiliary housing, a locking arm slidably mounted within the housings, one end of said locking arm being formed with an opening to accommodate the guide rod, the opposite end of said locking arm including a pair of spaced arms, and a tapered portion between the arms, the end of the tapered portion terminating in spaced relation with the ends of the spaced arms, an enlarged portion forming a part of the arm and operating in the auxiliary housing, said enlarged portion having an opening formed therein, an operating arm having an offset portion adapted to operate through the opening to move the locking arm within the housing, a coiled spring on the locking arm to normally urge the locking arm to its inactive position, and said spaced arms adapted to move on opposite sides of gears to guide the tapered portion of the locking arm to the teeth of the gears locked thereby.

In testimony that I claim the foregoing as my own, I have hereto affixed my signature in the presence of two witnesses.

EUGENE A. BRYANT.

Witnesses:
 WALTER LOWE,
 JAMES LOWE.